(12) United States Patent
Genchel et al.

(10) Patent No.: US 9,574,839 B2
(45) Date of Patent: Feb. 21, 2017

(54) FOLDABLE AND ADJUSTABLE BIPOD REST

(71) Applicant: STEINERT SENSING SYSTEMS AS, Oslo (NO)

(72) Inventors: Jonas Genchel, Stockholm (SE); Mikael Sundberg, Upplands Väsby (SE)

(73) Assignee: STEINERT SENSING SYSTEMS AS, Oslo (NO)

( * ) Notice: Subject to any disclaimer, the term of this patent is extended or adjusted under 35 U.S.C. 154(b) by 0 days.

(21) Appl. No.: 14/761,415

(22) PCT Filed: Feb. 13, 2013

(86) PCT No.: PCT/EP2013/052894
§ 371 (c)(1),
(2) Date: Jul. 16, 2015

(87) PCT Pub. No.: WO2014/124669
PCT Pub. Date: Aug. 21, 2014

(65) Prior Publication Data
US 2015/0362278 A1    Dec. 17, 2015

(51) Int. Cl.
*F16M 13/00* (2006.01)
*F41A 23/10* (2006.01)
*F16B 7/10* (2006.01)
*F16M 11/26* (2006.01)
*F16M 11/32* (2006.01)

(52) U.S. Cl.
CPC ............ *F41A 23/10* (2013.01); *F16B 7/10* (2013.01); *F16M 11/26* (2013.01); *F16M 11/32* (2013.01)

(58) Field of Classification Search
CPC ........... F41A 23/16; F41A 23/02; F41A 23/08; F41A 23/10; F41A 23/18; F41A 23/06; F41A 23/04; F41A 23/14; F41A 23/12; F41A 23/00; F41A 35/00; F41A 29/00; F41A 23/34; F41A 27/06; F41A 27/22; F16M 11/38; F16M 11/16; F16M 13/00; F16M 11/10; F16M 11/32; F16M 11/28; F16M 11/20; F16M 11/00; F16M 2200/08; F16M 11/242; F16M 2200/027; F16M 11/041; F16M 13/02; F16M 11/34; F16M 11/22
(Continued)

(56) References Cited

U.S. PATENT DOCUMENTS

| 2,420,267 A | 5/1947 | Sefried |
| 7,584,568 B1 * | 9/2009 | Brownlee ............... F41C 23/16 42/94 |

(Continued)

FOREIGN PATENT DOCUMENTS

| CN | 201100511 Y | 8/2008 |
| DE | 202006001450 U1 | 6/2007 |
| GB | 2090951 A | 7/1982 |

OTHER PUBLICATIONS

International Search Report dated Jul. 11, 2013 of PCT/EP2013/052894 which is the parent application—4 pages.
(Continued)

*Primary Examiner* — Steven Marsh
(74) *Attorney, Agent, or Firm* — Knobbe Martens Olson and Bear, LLP

(57) ABSTRACT

A user friendly bipod is configured to provide support for firearms, cameras, binoculars, or the like. The bipod includes foldable legs that are adjustable in length/height. The bipod also includes at least one magnetic lock for locking or releasing mechanical parts of the bipod.

5 Claims, 5 Drawing Sheets

(58) Field of Classification Search
USPC .................. 248/166, 434, 435, 168; 42/94
See application file for complete search history.

(56) References Cited

U.S. PATENT DOCUMENTS

| | | |
|---|---|---|
| 8,146,876 B1 | 4/2012 | Young et al. |
| 2003/0060344 A1 | 3/2003 | David |
| 2006/0082321 A1* | 4/2006 | Van Deursen ......... F16M 11/16 315/200 A |
| 2009/0038199 A1 | 2/2009 | Oz |
| 2009/0056192 A1* | 3/2009 | Oz ......................... F41C 23/16 42/94 |
| 2009/0195000 A1 | 8/2009 | Howey |
| 2009/0249674 A1 | 10/2009 | Boord |
| 2011/0031358 A1* | 2/2011 | Fischer ................. F16M 11/34 248/168 |
| 2011/0225890 A1 | 9/2011 | Greenwood et al. |

OTHER PUBLICATIONS

Written Opinion dated Jul. 11, 2013 of PCT/EP2013/052894 which is the parent application—6 pages.
International Preliminary Report on Patentability dated Jan. 30, 2015 PCT/EP2013/052894 which is the parent application—10 pages.

* cited by examiner

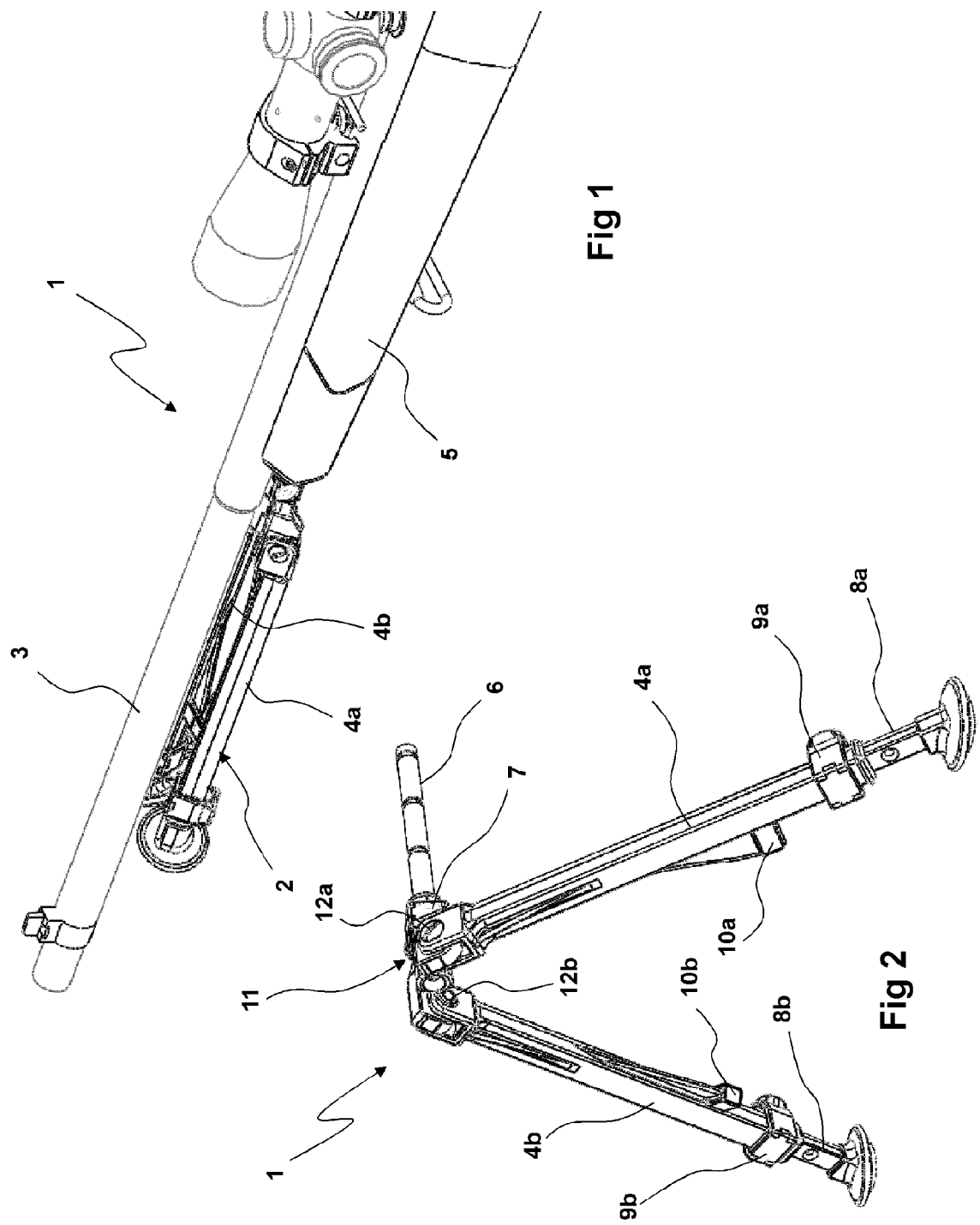

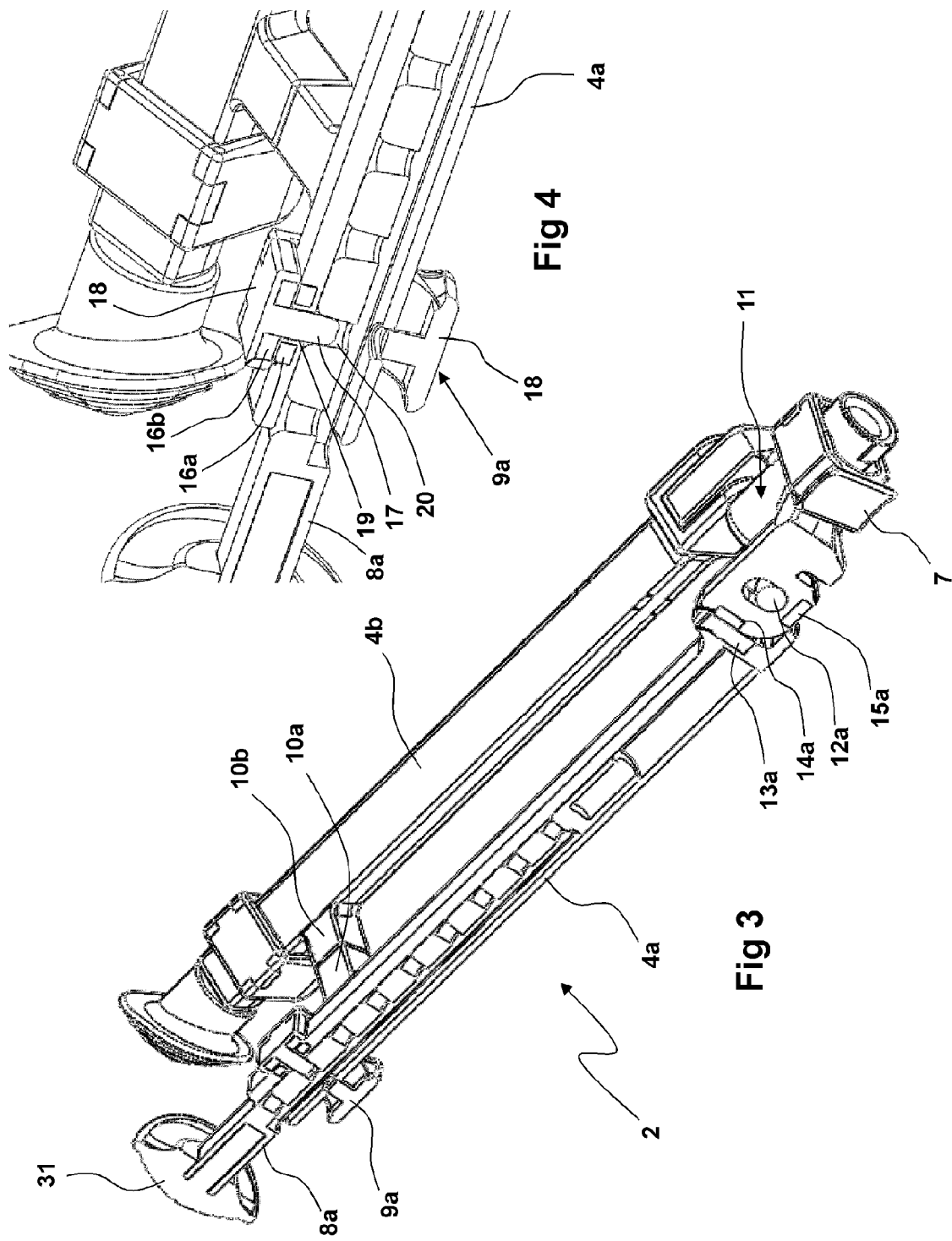

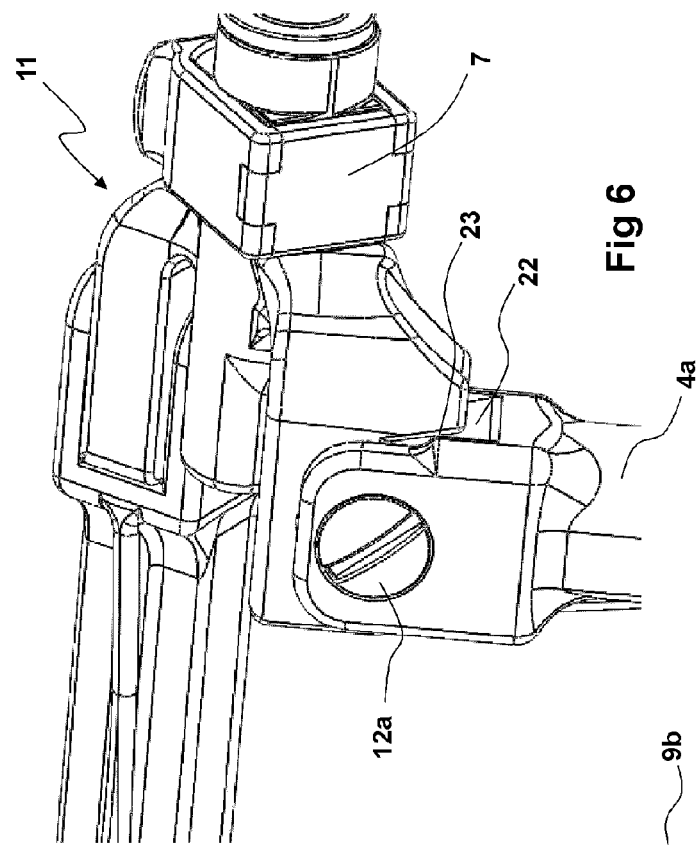
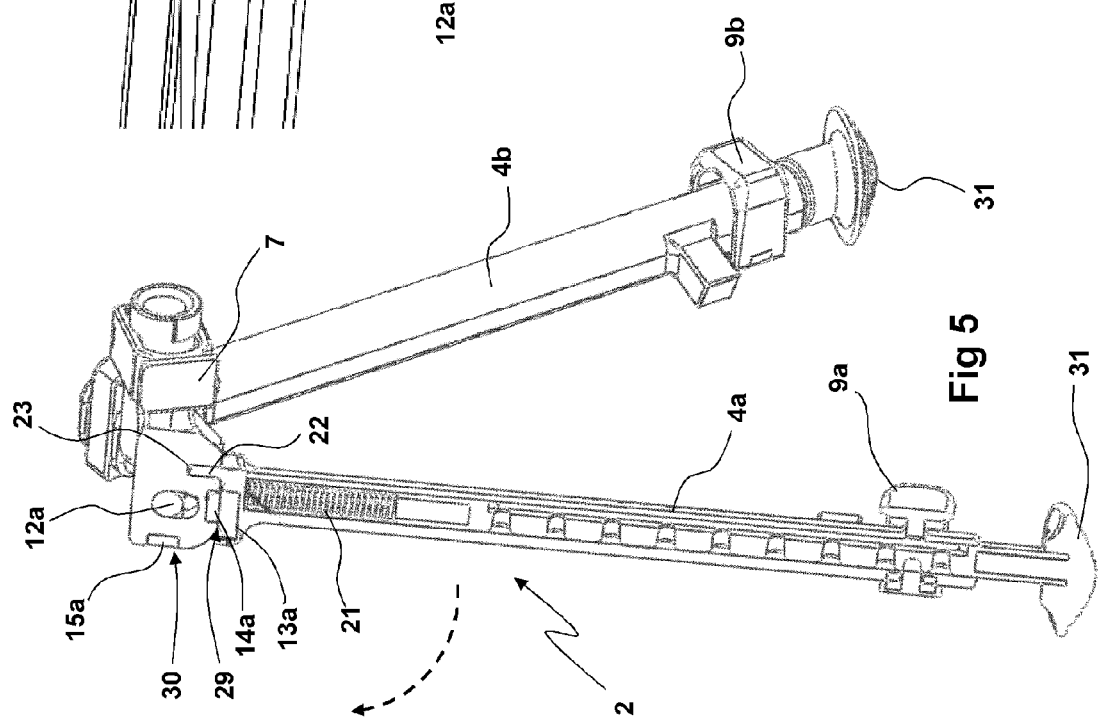

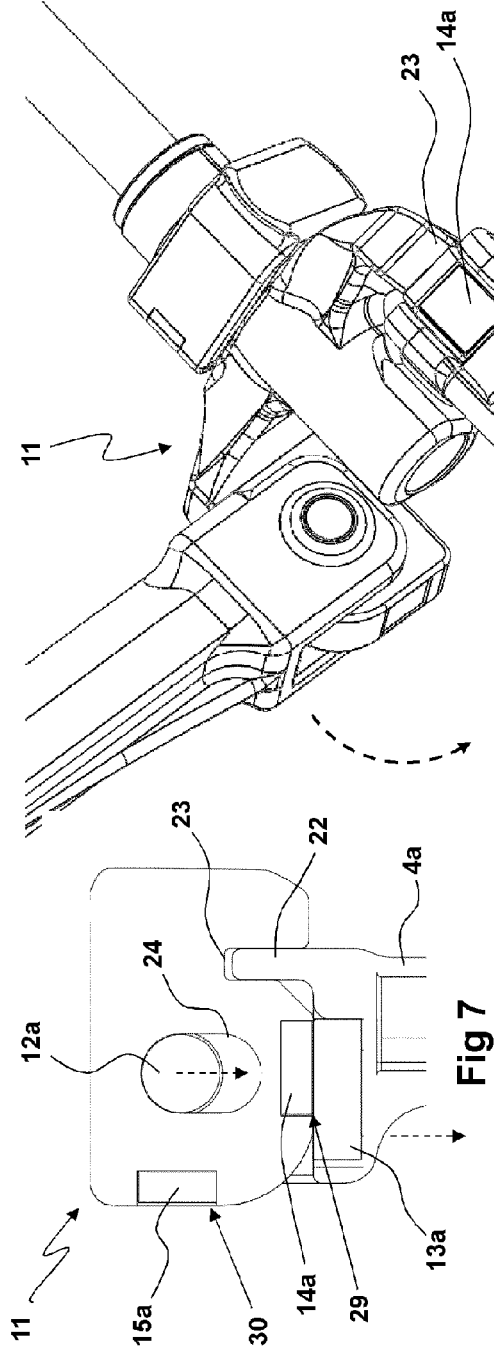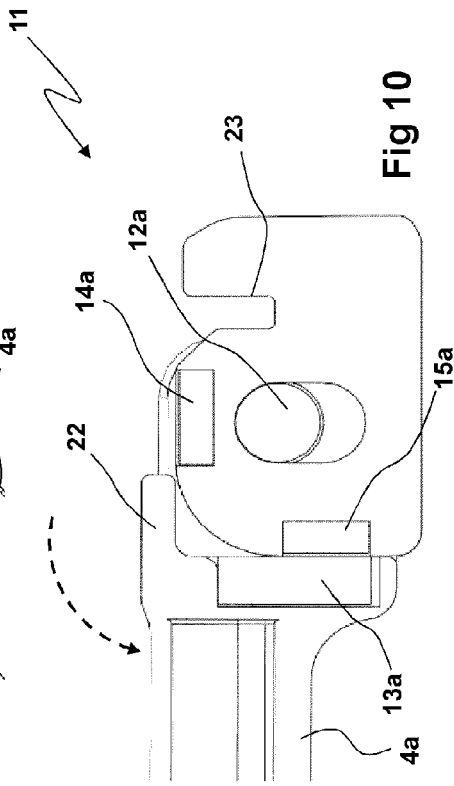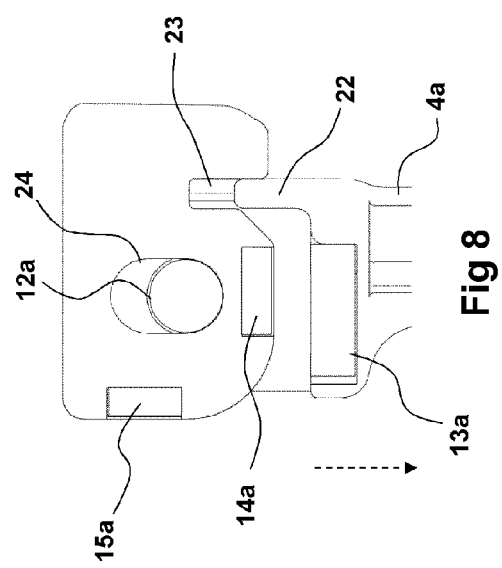

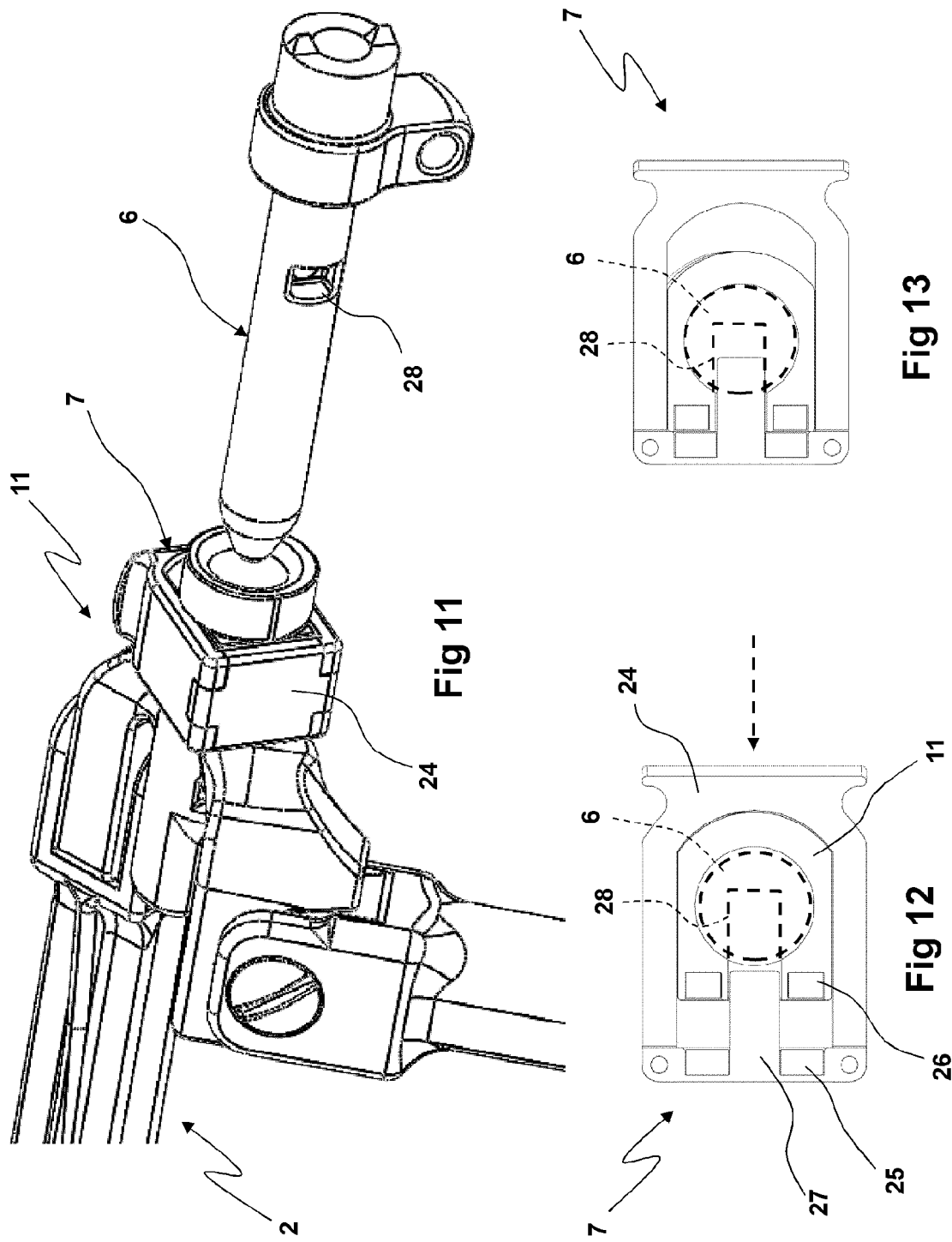

FOLDABLE AND ADJUSTABLE BIPOD REST

FIELD OF THE INVENTION

The invention relates in general to a rest or support, such as a bipod, especially intended for firearms, cameras, binoculars or the like. The invention relates primarily to a small light bipod rest that is very user friendly and easily could be carried/transported. The invention also relates to a special locking mechanism for locking mechanical parts to each other, e.g. in the bipod. The invention also relates to a folding mechanism for e.g. folding the legs of the bipod.

BACKGROUND ART

Shooting rests have long been used as an important way to improve results when shooting at a distance. For a more mobile operation a bipod should normally be used. Unlike an e.g. tripod, a bipod allow for quick and dramatic changes of position with short or little setup time. The stability improvements of a bipod give the user an edge on the shooting range or hunting trail. If the shooting takes place after walking long distances it is an important benefit to use a bipod, especially if it has low weight and is easy to handle and use. Having support for the full weight of the gun will also allow the user to line up the shot before the hands of the user shakes from excertion.

When it comes to cameras a bipod works similarly to a monopod, but the extra leg will certainly give more stability and is an improvement for e.g. camera shots with a longer shutter speed. Whether you want to use your bipod with a camera, binocular or firearm, it is an important accessory for optimal performance. Most bipods attach to a rifle by way of a sling swivel stud, although it is a functional method of attachment, there is room for improvements.

Once the bipod is attached to the firearm, the height of it and the cant of the firearm must be adjusted to suit the firing point. Also here it is room for improvements.

A number of different designs of bipods for supporting of firearms are already known. None of them, however, is just as easy and user-friendly as the present invention and none of them uses mechanical locks based on magnets according to the present invention. And it has not earlier been demonstrated any folding mechanism for the legs of such a rest that are designed according to the present invention and that in the same time results in a simple operation.

There is therefore a need for a new and improved design that is easy to carry around and is easy to handle and that it can be handled with a single hand. It is also desirable that the structure itself is simple and cost effective to manufacture. It is also desirable that the rest is compact and only needs a small space for storing so it is easy to transport but in the same time could be quickly set up and used.

SUMMARY OF THE INVENTION

One object of the present invention is to solve the problems indicated above and to create a bipod rest that is user friendly and fast to use and that will allow the user to handle all mechanical parts with only one hand.

A further object is to provide a new and efficient mechanical device, which easily and effectively could lock the parts to each other and easily and quickly could release the same parts from each other.

A further object of the invention is to create a super light bipod that is easy to carry, such as in a pocket, and that will not weigh down the firearm or optical equipment the rest is mounted on.

A further object of the invention is to provide a rest that is easy to fold and unfold, and which in its stored position is streamlined and reduces the risk to get stuck in surrounding parts, bushes, branches etc, and also reduces the risk of projecting parts that could be pressed or pinched against the person carrying the weapon.

A further object of the invention is that rest should be simple in its design and consist of as few parts as possible and thus be cost effective to manufacture.

A further object of the invention is that the rest should be small and compact.

A further object of the present invention is that the rest should be easy to assemble and disassemble to the weapon or to the optical equipment on which it is mounted.

These and additional objects and advantages are achieved according to the invention with a rest having the features according to the characterizing part of claim 1.

The invention relates in general to a rest or support, such as a bipod, especially intended for firearms, cameras, binoculars or the like. The invention relates primarily to a small very light bipod rest that is very user friendly and easily could be carried/transported. The invention also relates to a special locking mechanism for locking mechanical parts to each other, e.g. in the bipod. The invention also relates to a folding mechanism for e.g. folding the legs of the bipod.

The invention is achieved by designing the rest of a light and a non-magnetic material, preferably a light metal, such as magnesium, or plastic composites. In order to do all mechanical features user-friendly, and simple and quick to operate, is a new type of locking device used that is based on the attraction force between magnets.

By the inventive design the disadvantages of the prior art is eliminated, and a more practical, light weight, streamlined, functional and above all easily adjustable rest is achieved.

The rest according to the invention eliminates the need to use two hands simultaneously for manually operate different mechanical parts and locking devices in unfolding the rest and for individually adjusting the heights of the legs.

The inventive solution thus in its simple design results in a rest that ensures the required features and at the same time safely can handle the weight of the equipment supported. The invention also allows for an ergonomically beneficial and quick handling of the rest. It is the combination of light weight, easy to handle and that it requires little space that makes the difference compared to prior art. The weight of a rest/bipod is very important for a shooter where extra weight makes it heavy to carry and hard to aim.

The invention can of course also be used in other types of equipment or in other applications where the adjustment of a device, such as adjusting its height to a desired position, may constitute a problem, such as being time consuming. It is also possible to add more legs so it can be used as tripods or for other consumer products using legs.

Further features and advantages of the invention will become apparent from the following more detailed description of the invention and the accompanying drawings and dependent claims.

BRIEF DESCRIPTION OF THE DRAWINGS

The invention is described below in some preferred embodiments, in the light of the accompanying drawings.

FIG. 1 illustrates in perspective and from the side a firearm with a folded rest mounted to the barrel.

FIG. 2 illustrates in perspective and in a front view a separated and unfolded rest wherein a removable bracket for mounting the rest to a firearm is also visible.

FIG. 3 illustrates in perspective and in a side view a folded bipod and a section of one of the legs revealing the inner leg and a locking device, according to the invention, for locking the inner and outer legs to each other.

FIG. 4 illustrates more in detail, and in a section through one leg, the locking means including magnets.

FIG. 5 illustrates a perspective view of the unfolded rest and again a section through one of the legs in which the spring projecting the inner leg can be seen.

FIG. 6 illustrates a perspective view from the side of the top mounting part of the rest with one of the legs unfolded and locked in its unfolded position.

FIG. 7 illustrates, schematically and from the side, how a leg is unfolded and locked in that position and also the magnets locations achieving the locking functions.

FIG. 8 illustrates the same view as FIG. 7, but here is shown how the leg has been pulled out in the axial direction in a first step to be folded.

FIG. 9 illustrates in perspective and from below, the leg in its folded position, exposing the magnetic holding the leg locked in the unfolded position.

FIG. 10 illustrates schematically the same position as shown in FIG. 9 showing both, from below, the magnets holding the leg in its folded and unfolded positions.

FIG. 11 is a perspective view from the side of the top mounting part and the removable bracket, to be mounted on the firearm for fast assembly and unassembled, as well as the lock holding the rest and the bracket together.

FIG. 12 illustrates schematically a section through the lock for the bracket in its unlocked position.

FIG. 13 illustrates schematically a section through the lock for the bracket in its locked position.

DETAILED DESCRIPTION OF PREFFERED EMBODIMENTS

The invention consists of a rest such as a bipod, intended for firearms, cameras, binoculars or the like and that is easy to handle and to adjust in height during use. An important feature of the rest is that it is compact and light. The invention also relates to a special locking mechanism for locking mechanical parts to each other and also to a folding mechanism for folding the legs of the bipod in an easy manner. To achieve these properties, the support is made of a lightweight material, preferably a light metal such as magnesium. The lightweight material could also consist of a composite material and/or a non-magnetic material.

In order to make all mechanical features of the rest user-friendly, and simple and quick to operate, a new type of locking device is developed and used that is based on the attraction force between magnets. The use of super strong small Neodyn magnets makes the locking powerful enough and the rest compact, small, light and easy to use. The design of the lock with the magnets also makes it possible to use and adjust the rest with only one hand. The new locking mechanism also makes it possible to streamline the design of the rest with only small or no parts sticking out.

FIG. 1 illustrates in perspective and from the side a part of a firearm, a rifle 1, with a folded rest 2 mounted below the barrel 3. The rest 2 or bipod has two different possible positions for its legs 4a,b, unfolded when in shooting position and folded (shown) when carrying the rifle around. When folded as shown the rest 2 is streamlined with the rifle 1 in order not to interact in a bad way with surrounding parts, branches etc. It is also important that no parts of the rest 2 stick out hitting and scraping the user when the rifle is worn on the users back etc.

The rest 2 is located below the barrel 3 of the rifle 1 and preferably attached to the stock 5 of the rifle 1 while the folded legs 4a,b are pointing forward in relation to the rifle 1.

FIG. 2 illustrates in perspective and in a front view an unfolded rest 2, here separated from the rifle. A long removable bracket 6 for mounting the rest 2 to the rifle 1 is also visible. The bracket 6 could be locked or removed by the help of a mechanical lock 7 using a magnet (not shown). The legs 4a,b are unfolded for setting on the ground.

The height and angle of the rest 2 is adjustable by help of inner parts 8a,b in each leg 4a,b that may be pulled out, or retracted, and locked in a desired position by help of mechanical locks 9a,b. These mechanical locks 9a,b may be operated by the help of one hand.

When folded, the legs 4a,b are kept together by two magnets 10a,b attracting each other. Each magnet 10a,b is located at the inside of the two legs 4a,b, near the lower/outer ends of the legs 4a,b and in the folded position of the rest 2 the two magnets 10a,b are located adjacent to each other, attracting each other.

In the top mounting part 11 one magnet (see FIGS. 7-10) is located for each leg 4a,b, near joints/axles 12a,b, that attract each other in such a way that the legs 4a,b are locked in their unfolded position and able to e.g. support a heavy firearm.

FIG. 3 illustrates in perspective in a side view a folded rest 2, a bipod, and a section view of one of the legs 4a revealing the inner part 8a and a locking device 9a, according to the invention, for locking the outer leg 4a to the inner part 8a in relation to each other.

When folded, the legs as said, are kept together by two magnets 10a,b attracting each other. Each magnet 10a,b is located at the inside of the two legs 4a,b, near the outer ends of the legs 10a,b.

In the top mounting part 11 two joints/axles 12a,b, one for each leg 4a,b are located. In the rests 2 folded position one magnet 13a,b is arranged in each leg 4a,b near the top mounting part 11 and one magnet 14a is arranged in the top part 11 for keeping the legs 4a,b in the folded position.

When the legs 4a,b are unfolded there is a further magnet 15a,b located in the top mounting part 11, for each leg 4a,b, for attracting each other in such a way that the legs 4a,b are kept and locked in their unfolded position keeping the legs unfolded and able to support e.g. a heavy firearm.

The magnets 10a,b mounted at the inside of, and lower/outer ends of the two legs 4a,b, could be omitted as the legs 4a,b still will be kept folded by the magnets 13a,b and 14a,b located in the top mounting part 11, near the joints/axles 12a,b.

FIG. 4 illustrates more in detail, and in a section through one leg 4a, the lock 9a for locking the inner part 8a to the leg 4a, illustrating the location of a first and second magnets 16a,b. These magnets 16a,b are preferable circular or ring formed, thereby surrounding the center tap 17 of an axially movable button 18. One of the magnets 16a is located in the leg 4a and one magnet 16b is located in the button 18. When not manually activated, pressed, the tap 17 of the button 18 penetrates both a hole 19 in the leg 4a and a hole 20 in the inner part 8a, thereby locking the leg 4a and the inner part 8a in a specific position in relation to each other. When manually pressed/pushed (here from below) the button 18 moves, axially upwards in the figure, moving the tap 17 out of the hole 20 of the inner part 8a and thereby releasing the leg 4a in relation to the inner part 8a. The inner part 8a then may be pulled axially out by hand or by help of a spring 21 located inside the leg (see FIG. 5) or retracted by exerting a force to the inner part 8a, at its outer tip 31, pressing it into the leg4a.

When not manually activated the button 18 is kept in its locked position by help of the attracting force of the magnets 16a,b.

FIG. 5 illustrates a perspective view of the unfolded rest 2 and again illustrating a section through one of the legs 4a in which the spring 21 projecting the inner part 8a can be seen.

Also the lock 7 for the bracket 6 is illustrated. This lock 7 is designed in a similar way as the locks 9a,b for the legs 4a,b. By help of this lock 7 the rest 2 is easy and fast to mount to a firearm or to remove from the firearm. This lock 7 will be explained in more detail below.

The leg 4a is rotatable (see arrow) around a joint/axle 12a between two end positions. The one end position shown is securing the leg 4a in its unfolded position by help of a heel 22 pushed into a slot 23. A first lock 29 consisting of two magnets 13a, 14a keeps the leg 4a in this unfolded position. A second lock 30 consisting of the magnets 13a and 15a will keep the leg 4a in a folded position.

FIG. 6 illustrates a perspective view from the side of the top mounting part 11 of the rest 2 where one of the legs 4a is unfolded and locked in its unfolded position by a the lock 29.

FIG. 7 illustrates, schematically and from the side, an unfolded leg 4a locked in its position. This lock One magnet 13a is located in the upper part of the leg 4a and the other magnet 14a is located in the top part 11 of the rest 2. The magnets 13a, 14a are positioned in such a way that they will be placed adjacent to each other in the locked position of the leg 4a and thereby attracting each other.

The joint/axle 12a is designed to be movable in an elongated opening/hole 24 in the top mounting part 11 so that the leg 4a may be manually pulled a small distance down (see arrows) in its axial direction thereby releasing the stop heel 22 from the slot 23 in the top mounting part 11 of the rest 2 and after that the leg 4a could be rotated about 90 degrees. This maneuver is possible to complete with one hand.

It is very important that the legs 4a,b will not fold when the rest 2 is used, e.g. for shooting etc and that's why a stop heel 22 is pressed into the slot 23, by rotating the leg 4a,b and moved upwards a small distance, by moving the joint/axle 12a in the elongated opening/hole 24 and locked in this position when the legs 4a,b are unfolded.

FIG. 8 illustrates the same view as FIG. 7, but showing the leg 4a pulled in the axial direction (see arrow) in a first step to be folded. The stop heel 22 is released from the slot 23 and the leg 4a will be possible to fold around its joint/axle 12a.

FIG. 9 illustrates in perspective and from below, one of the legs 4a in its folded position, exposing the magnet 14a and the slot 23 keeping the leg 4a locked in the unfolded position.

FIG. 10 illustrates schematically the same position as shown in FIG. 9 showing, from below, both the magnets 13a, 15a keeping the leg 4a in its folded position. One magnet 13a is arranged in the upper part of the leg 4a and the other magnet 15a is arranged in the top mounting part 11 of the rest 2. Also the magnet 14a keeping the leg 4a in its unfolded position is illustrated as well as the stop heel 22 and slot 23 for securing the leg 4a in its unfolded position.

FIG. 11 is a perspective view of the top mounting part 11 and illustrates the removable bracket 6, to be mounted at the outer end to e.g. a firearm, as well as the lock 7 with a button 24 for manually operating and keeping the rest 2 and the bracket 6 together. A hole 28 is adapted for making it possible to lock the two parts together.

FIG. 12 illustrates schematically a section through the lock 7 according to FIG. 11. The figure illustrates the lock 7 in its unlocked position, i.e. the button 24 is manually pressed to the left in the figure, and in which position the rest 2 may be retracted from or mounted on the bracket 6. One preferable ring formed magnet 25 is located in the button 24 and one magnet 26 is located in the top mounting part 11. When manually pushed to the left in the figure a tap 27 mounted inside the button 24 is moved in the same direction releasing from the hole 28 of the bracket 6 allowing the bracket 6 to be inserted to or removed from the top mounting part 11.

FIG. 13 illustrates schematically a section through the lock 7 as shown in FIG. 12. This figure illustrates the bracket 6 in its locked position. The magnets 25, 26 attract each other when the button 24 is manually released and the tap 27 is moved to the right in the figure, penetrating the hole in the bracket 6, thereby keeping the bracket 6 in an exact and locked position. When the button 24 is manually pressed the lock 7 is released and the bracket 6 may be removed and taken away.

The above description is primarily intended to facilitate the understanding of the invention. The invention is of course not limited to the above embodiments but also other variants of the invention are possible and conceivable within the scope of the invention and the appended claims. The invention is of course possible to use in other applications not mentioned here.

The invention claimed is:

1. Shooting rest configured to be mounted to a barrel of a firearm, the shooting rest comprising:
    foldable legs adjustable in length/height, and connected to a bracket for mounting the shooting rest to the barrel by a top mounting part of the shooting rest, wherein the foldable legs are movable between a folded position in which the shooting rest is streamlined with the firearm and an unfolded shooting position, and
    a plurality of magnetic locks for locking or releasing mechanical parts of the shooting rest, wherein at least one of the plurality of magnetic locks is configured to secure the foldable legs in the folded position or the unfolded shooting position, wherein the plurality of magnetic locks comprise a first magnet lock located in an upper part of the leg and a second magnet lock located in the top mounting part for locking the foldable leg in the unfolded shooting position, and a third magnet lock located in the top mounting part for securing the foldable legs in the folded positioned.

2. Shooting rest according to claim 1, wherein each of the foldable legs comprises a magnetic lock configured to secure the foldable legs in a desired length/height position after adjusting length/height of the respective leg.

3. Shooting rest according to claim 1, at least one of the plurality of magnetic locks is configured to secure the top mounting part to the bracket.

4. Shooting rest according to claim 1, wherein the plurality of magnetic locks include a Neodyn magnet.

5. Shooting rest according to claim 1, wherein the shooting rest is configured such that an inner part of the foldable legs can be retracted by exerting a force, at its outer tip, so as to press the inner parts into the legs.

* * * * *